(12) United States Patent
Kastner et al.

(10) Patent No.: US 10,083,305 B2
(45) Date of Patent: Sep. 25, 2018

(54) METHOD AND SYSTEM PROVIDING MUTLI-LEVEL SECURITY TO GATE LEVEL INFORMATION FLOW

(71) Applicant: The Regents of the University of California, Oakland, CA (US)

(72) Inventors: Ryan Kastner, La Jolla, CA (US); Jason Oberg, La Jolla, CA (US); Wei Hu, La Jolla, CA (US); Timothy Sherwood, Santa Barbara, CA (US); Mohit Tiwari, Austin, TX (US)

(73) Assignee: The Regents of the University of California, Oakland, CA (US)

( * ) Notice: Subject to any disclaimer, the term of this patent is extended or adjusted under 35 U.S.C. 154(b) by 22 days.

(21) Appl. No.: 14/773,679

(22) PCT Filed: Mar. 14, 2014

(86) PCT No.: PCT/US2014/028084
§ 371 (c)(1),
(2) Date: Sep. 8, 2015

(87) PCT Pub. No.: WO2014/143912
PCT Pub. Date: Sep. 18, 2014

(65) Prior Publication Data
US 2016/0026801 A1 Jan. 28, 2016

Related U.S. Application Data

(60) Provisional application No. 61/787,941, filed on Mar. 15, 2013.

(51) Int. Cl.
*G06F 21/60* (2013.01)
(52) U.S. Cl.
CPC ...... *G06F 21/60* (2013.01); *G06F 2221/2113* (2013.01)

(58) Field of Classification Search
CPC ... G06F 21/69; G06F 2221/2113; G06F 21/60
See application file for complete search history.

(56) References Cited

U.S. PATENT DOCUMENTS

| | | | |
|---|---|---|---|
| 2007/0006294 A1 | 1/2007 | Hunter | |
| 2014/0096178 A1* | 4/2014 | Shippy | G06F 21/316 726/1 |

OTHER PUBLICATIONS

Tiwari et al., Gate-Level Information-Flow Tracking for Secure Architectures, 2010, IEEE Journals & Magazines, vol. 30, Issue: 1, pp. 92-100.*

(Continued)

*Primary Examiner* — Brandon S Hoffman
*Assistant Examiner* — Nega Woldemariam
(74) *Attorney, Agent, or Firm* — Greer, Burns & Crain, Ltd.; Steven P. Fallon

(57) ABSTRACT

A preferred method for providing multi-level security to a gate level information flow receives or specifies a security lattice having more than two security levels. The security lattice defines how security levels relate to each other. A hardware design implementing information flows including flows having security levels specified by the security lattice is received. Logic is created for testing the hardware design in view of the security lattice. A logic function is created based upon the hardware design and the logic for testing to implement the security lattice. Another method receives a hardware design in a hardware description language. At least a portion of the hardware design is synthesized to gate level primitives. Functional component tracking logic supporting more than two-security levels is built from the gate level primitives. Functional components in the hardware design are simulated with the functional component tracking logic.

9 Claims, 4 Drawing Sheets

(56) References Cited

OTHER PUBLICATIONS

Hu, W., et al., "Reducing timing channels with fuzzy time", Proceedings of the 1991 IEEE Symposium of Security and Privacy, (1991), pp. 8-20.

Hu, W., et al., "Theoretical Fundamentals of Gate Level Information Flow Tracking", IEEE Trans. Computer-Aided Design of Integrated Circuits and Systems, vol. 30, Issue 8, (2011), pp. 1128-1140.

Hu, W., et al., "Expanding Gate Level Information Flow Tracking for Multi-level Security in Critical Embedded Systems", IEEE Embedded Systems Letters, vol. 5, Issue 2, May 3, 2013, pp. 25-28.

Kastner, Ryan, et al.. "Enforcing Information Flow Guarantees in Reconfigurable Systems with Mix-Trusted IP", International Conference on Engineering of Reconfigurable Systems and Algorithms (ERSA), (Jul. 2011), 12 pages.

Kemmerer, Richard A., "Shared Resource Matrix Methodology: An Approach to Identifying Storage and Timing Channels", ACM Transactions on Computer Systems, vol. 1, No. 3, (Aug. 1983), pp. 256-277.

Li, Xun, et al., "Caisson: A Hardware Description Language for Secure Information Flow", PLDI'11, Proceedings on the 32nd ACM SIGPLAN conference on Programming language design and implementation, Jun. 4-8, 2011, pp. 109-120.

Oberg, Jason, et al., "Information Flow Isolation in I2C and USB", Proceedings of the 48th Design Automation Conference (DAC) 2011, Jun. 5-10, 2011, pp. 254-259.

Oberg, Jason, et al., "Leveraging Gate-Level Properties to Identify Hardware Timing Channels", IEEE Transactions on Computer-Aided Design of Integrated Circuits and Systems, vol. 33, Issue 9, (Sep. 2014), pp. 1288-1301.

Tiwari, Mohit, et al., "Execution Leases: A Hardware-Supported Mechanism for Enforcing Strong Non-Interference" 42nd Annual IEEE/ACM International Symposium on Microarchitecture, 2009. MICRO-42, Dec. 12-16, 2009, pp. 493-504.

Tiwari, Mohit, et al., "Crafting a Usable Microkernel, Processor, and I/O System with Strict and Provable Information Flow Security", 38th Annual International Symposium on Computer Architecture (ISCA), 2011, Jun. 4-8, 2011, pp. 189-199.

Tolstrup, Terkel, K.,"Language-based Security for VHDL", PhD Thesis, Informatics and Mathematical Modelling, Technical University of Denmark, DTU, (2007), 158 pages.

Wray, John C., "An Analysis of Covert Timing Channels", Proceedings of the 1991 IEEE Symposium on Security and Privacy, (1991), pp. 2-7.

\* cited by examiner

METHOD AND SYSTEM PROVIDING MUTLI-LEVEL SECURITY TO GATE LEVEL INFORMATION FLOW

PRIORITY CLAIM AND REFERENCE TO RELATED APPLICATION

The application claims priority under 35 U.S.C. § 119 and from applicable treaties from prior provisional application Ser. No. 61/787,941, which was filed Mar. 15, 2013.

FIELD

A field of the invention is data security. The invention concerns secure computing systems and computer infrastructures. The invention is widely applicable to digital devices and microprocessor based systems.

BACKGROUND

Critical embedded systems such as those found in military, industrial infrastructures, financial services infrastructures and medical devices require strict guarantees on information flow security. Security breaches can have extremely high costs in both monetary and human terms. These systems require rigorous design and testing to ensure that untrusted information never affects trusted computation or that secret information never leaks to unclassified domains. Cybersecurity is increasingly important as private and public institutions rely more and more on electronic data flow. There are many examples of security breaches, and contrary interests will continue to attempt to obtain access.

Timing channels are a form of a so-called side channel that can be used by those that seek to exploit secure systems, including those in military, industrial and financial services infrastructures. A side channel is created by a circuit element that leaks information unintentionally. Side channels can be exploited by adversaries to extract secret information or compromise the correct operation of high integrity components.

Modern embedded computing systems, including highly secure systems, increasingly rely upon embedded computing systems. Such systems often include a system-on-chip. A system-on-chip includes multiple cores, controllers or processors on integrated single microchip. The movement of information in such systems should be tightly controlled to ensure security goals. This is challenging because information can flow through timing channels, which are difficult to detect. In turn, hardware designs that are insusceptible to timing channels are difficult to provide because the designs can't be effectively tested for possible flaws that support timing channels.

Seminal work by Kemmerer [R. A. Kemmerer, "Shared resource matrix methodology: an approach to identifying storage and timing channels," ACM Trans. Comput. Syst., pp. 256-277, 1983], described an informal shared-resource matrix to pin-point potential timing channels. Effective at higher computing abstractions, this technique becomes difficult to apply to embedded and application-specific designs.

A number of Ad-hoc approaches [M. Hu, "Reducing timing channels with fuzzy time," in Proceedings of the 1991 IEEE Symposium on Security and Privacy, pp. 8-20, 1991], [. C. Wray, "An analysis of covert timing channels," in Proceedings of the 1991 IEEE Symposium on Security and Privacy, pp. 2-7, 1991] focus on introducing random noise into a system to make extracting information stochastically difficult. These methods make a timing channel harder to exploit (lower signal-to-noise ratio), but fail to identify whether a channel is timing-based. In addition, previous work using GLIFT has shown that strict information flow isolation can be obtained in a shared bus [J. Oberg, et al., "Information flow isolation in I2C and USB," in Proceedings of Design Automation Conference (DAC) 2011, pp. 254-259, 2011.], but the work provides no ability to relate information to timing.

Typical information flow tracking strategies target hardware description languages [X. Li et al, Caisson: a hardware description language for secure information flow," in PLDI 2011, pp. 109-120, 20], [T. K. Tolstrup, Language-based Security for VHDL. PhD thesis, Informatics and Mathematical Modelling, Technical University of Denmark, D T U, 2007]. This can be effective to prevent timing channels from developing. However, these languages force a designer to rewrite code in a new language. This is especially cumbersome when already designed hardware modules need to be analyzed.

There are two general classes of information flows: explicit and implicit. Explicit information flows result from two subsystems directly communicating. For example, an explicit flow occurs when a host and device on a bus directly exchange data. Implicit information flows are much more subtle. Implicit flows generally leak information through behavior. Typical implicit information flows show up in hardware in the form of timing, where information can be extracted from the latency of operations.

For example, it is known that that side channel timing attacks can be used to extract secret encryption keys from the latencies of caches and branch predictors, for example. Cache timing attacks can obtain the secret key by observing the time for hit and miss penalties of the cache. Branch predictor timing channels are exploited in a similar manner, when information is leaked through the latency of predicted and mis-predicted branches. It has also been recognized that the shared bus in modern systems is a source of concern. A so-called bus-contention channel has been recognized as permitting covert transmission of information through the traffic on a global bus. See, e.g., W.-M. Hu, "Reducing timing channels with fuzzy time," Proceedings of the 1991 IEEE Symposium on Security and Privacy, pp. 8-20, 1991.

Information flow tracking (IFT) is a common method used in secure systems to ensure that secrecy and/or integrity of information is tightly controlled. Given a policy specifying the desired information flows, such as one requiring that secret information should not be observable by public objects, information flow tracking helps detect whether or not flows violating this policy are present.

Hardware assisted IFT methods have been deployed to capture harmful flows of information including those through hardware specific timing channels Implicit flows resulting from these timing channels have been shown to leak secret keys in stateful elements such as caches and branch predictors. In addition, such timing flows can cause violations in real-time constraints, hindering real-time operations of a system or even rendering the critical system useless. Further, these channels are so hard to detect that they are usually identified only after operational critical security policies have been violated. IFT is a frequently used technique for enforcing information flow control (IFC). IFT associates a label with data, and monitors the propagation of this label through the system to check if sensitive data leaks to an unclassified domain or if integrity-critical components are affected by untrusted data. IFT has been deployed at various abstraction levels of a computing system, including in programming languages, compiler/OS, instruction set architecture and runtime systems. However, previous methods are all at too high a level of abstraction to capture hardware specific timing channels To fully account for information flow security in critical systems, researchers have proposed Gate-Level Information Flow Tracking (GLIFT). See, Hu et al., "Theoretical Fundamentals of Gate Level Information Flow Tracking," IEEE Trans. Computer-Aided Design of Integrated Circuits and Systems (2011). GLIFT monitors all digital information flows by tracking individual bits through Boolean gates. At such a low level of abstraction, GLIFT is able to capture all transition activities including register to register timing. As a result, all digital information flows are made explicit, including timing channels that are inherent in the underlying hardware implementation but invisible to programmers. Previous work by some of the inventors has illustrated the employment of GLIFT for building verifiably information flow secure high-assurance systems. GLIFT has been shown to be effective in detecting timing channels in bus protocols such as I2C and USB. See, Oberg et al., "Information flow isolation in I2C and USB," Design Automation Conference (DAC), 2011 48th ACM/EDAC/IEEE.

An execution lease architecture was developed to strictly bound the effects of untrusted programs. See, M. Tiwari, et al., "Execution leases: a hardware-supported mechanism for enforcing strong non-interference," in *MICRO* 2009, MICRO 42, pp. 493-504 (2009). This architecture employs GLIFT to show provable information flow isolation between different execution contexts. Further, GLIFT has been used to build a provably information flow secure system from the ground level up. See, M. Tiwari, et al, "Crafting a usable microkernel, processor, and I/O system with strict and provable information flow security," Proc. of the 38th annual international symposium on Computer architecture (ISCA'11), pp. 189-200 (New York, N.Y., 2011). Although GLIFT provides an effective approach for enforcing information flow security, the existing GLIFT method only targets a two-level linear security lattice and thus only considers two-level security labels, e.g., trusted < untrusted or, the dual, unclassified < confidential.

Many systems benefit from or require multi-level security (MLS). For example, data objects in military usage are typically classified into at least four security levels, namely top secret, secret, confidential and unclassified. A two-level linear security lattice simply cannot be used for modeling such a policy. In addition, many systems tend to be interested in non-linear lattices for modeling security policies.

For example, it is often desirable to have a policy which requires isolation of the highest security level (Top Secret) from several incomparable entities (e.g., Secret US and Secret UK). That is, the model specifies that Secret US and Secret UK are at the same level but represent two different objects. More specifically, Top Secret might be the label for a data encryption process which requires that Secret US and Secret UK learn nothing other than the cipher-text while it is perfectly secure for processes Secret US and Secret UK to learn information about one another. Prior applications of GLIFT can't provide more than two levels.

SUMMARY OF THE INVENTION

An embodiment of the invention expands gate level information flow tracking beyond two levels to more generalized security lattices in order to adapt to a wider range of systems. A preferred method for providing multi-level security to a gate level information flow receives or specifies a security lattice having more than two security levels. The security lattice defines how security levels relate to each other. A hardware design implementing information flows including flows having security levels specified by the security lattice is received. Logic is created for testing the hardware design in view of the security lattice. A logic function is created based upon the hardware design and the logic for testing to implement the security lattice.

A method for providing multi-level security to a gate level information flow receives a hardware design in a hardware description language. At least a portion of the hardware design is synthesized to gate level primitives. Functional component tracking logic supporting more than two-security levels is built from the gate level primitives. Functional components in the hardware design are simulated with the functional component tracking logic.

DESCRIPTION OF THE PREFERRED EMBODIMENTS

Figure 1:
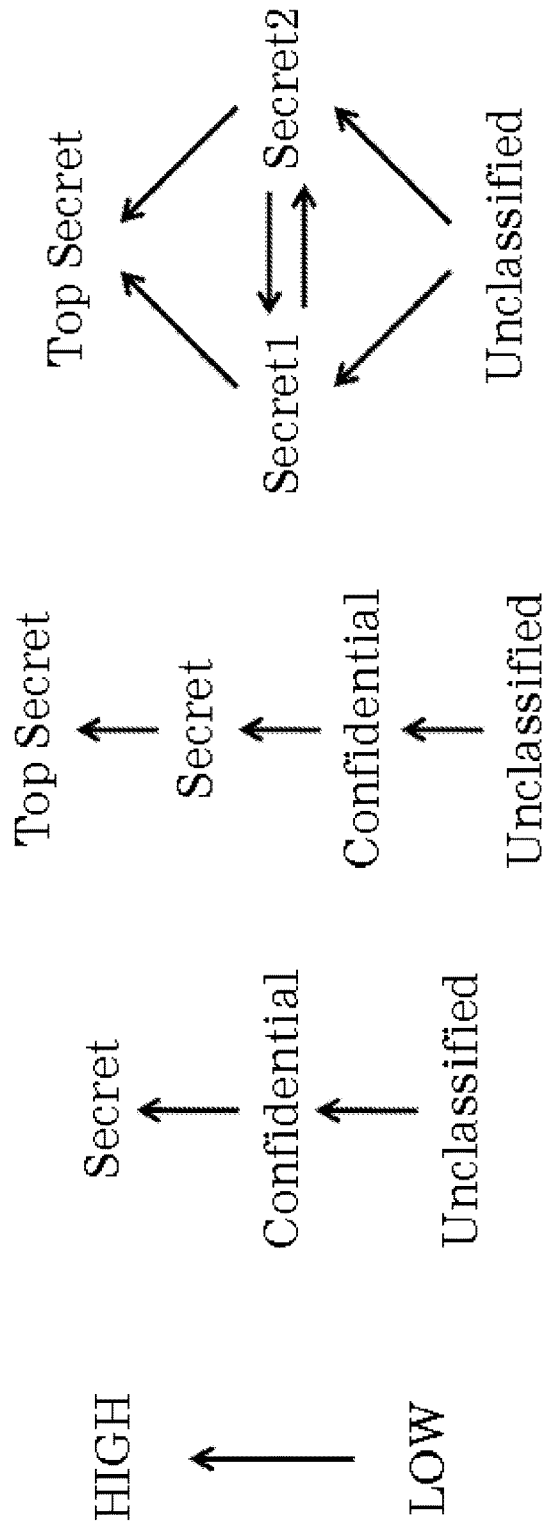
FIG. 1A illustrates a two-level security lattice.
FIGS. 1B-1D illustrate multi-level security lattices.

Methods of the invention meet high-level requirements for both integrity and confidentiality. Methods of the invention incorporate a formal model of information flow security. The model classifies data objects in a system into different security levels, tracks the flow of information between security domains, and enforces a specific security policy such as non-interference. While non-interference is a strong and useful security policy, it requires tight information flow control (IFC) to prevent unintended interactions between different system components resulting from harmful flows of information.

Preferred methods of the invention can be implemented via computer code stored on a non transient medium. Methods of the invention can also be implemented in hardware devices and systems that connected to microprocessors or other devices being evaluated for timing channels.

Information flow tracking (IFT) is a frequently used technique for enforcing IFC. IFT associates a label with data, and monitors the propagation of this label through the system to check if sensitive data leaks to an unclassified domain or if integrity-critical components are affected by untrusted data. IFT has been deployed at various abstraction levels of a computing system, including in programming languages, compiler/OS, instruction set architecture and runtime systems. However, previous methods are all at too high a level of abstraction to capture hardware specific timing channels. With more functional units, such as security primitives, being built into hardware to meet performance and power constraints, the present invention recognizes that embedded security be enforced from the underlying hardware up.

Particular embodiment methods of the invention provide the secure control of mission critical data flows through computer systems. Particular example systems that can benefit from such data include medical devices, banking systems or military operations. Methods of the invention can serve to limit, detect and/or prevent tagging of information at the bit level such that it can be followed through a computer system to test for security leaks or the potential for unwanted data to be added into a secure system. The state of the art hardware level information tracking however only allows for a binary determination of whether data is "trusted" or "un-trusted". In real world applications, security levels can be many and include, for example, the military's use of "top secret", "secret", "classified" and "un-classified". Embodiments of the invention provide a new ability to track data of different pedigrees.

Embodiments of the invention receive a design that is in a hardware description language. The design, or at least a portion of the design is synthesized down into low level hardware components—gate level primitives. Multi-level security tracking logic is then added to these gate level primitives. The hardware design can then be tested in a multi-security setting. That is, particular inputs can be labeled automatically or with user input or selection prompts via a user interface as 'top secret', 'secret1', etc. and information flows about those inputs can be analyzed via the code and information presented about the same can be presented through a user interface.

Testing can determine, for example, whether or not 'top secret' information is leaking to an 'unclassified' location. A hardware design can be analyzed by the method with respect to a multi-level general security policy to maintain distinctions between each of the multiple levels of security.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

A preferred method of the invention accepts a security lattice as an input. In the art, a lattice model is known for describing communication channels and information flows policies. An information flow policy can be modeled as a finite security lattice $\{SC, \sqsubseteq\}$, where SC is the set of security classes indicating different security levels of data objects and $\sqsubseteq$ defines the partial order on these security classes. Let $L:O \rightarrow SC$ be a function which returns the security class of its input object O. For example, $L(x)$ denotes the security class of an object $x \in O$ The security class of A is no higher (or more restrictive) than that of B if $L(A) \sqsubseteq L(b)$. In this case, information flowing from A to B will not violate the policy specified by the lattice and thus is secure.

FIGS. 1A-D illustrate few simple security lattices. In FIGS. 1A-1C, there are respectively two, three and four levels of security. As indicated by the arrows, the information flow is only permitted from a lower level up to higher levels, and not in the reverse direction. The example of FIG. 1D includes additional possible flows between levels Secret1 and Secret2. This is a military square lattice, and includes four security classes, i.e., SC={S0, S1, S2, S4}. In confidentiality analysis, S3 may stand for Top Secret, S0 can be Unclassified; S1 and S2 are two incomparable security classes that reside between Top Secret and Unclassified. The partial order defined by the lattice is $S0 \sqsubseteq S1$, $S0 \sqsubseteq S2$, $S1 \sqsubseteq S3$, and $S2 \sqsubseteq S3$. The arrows show the permissible information flows that do not lead to a security violation.

Let $\oplus$ denote the least upper bound operator on security classes. Given two security classes S1 and S2, $S1 \oplus S2$ calculates the most restrictive security class S, satisfying that $S1 \sqsubseteq S$ and $S2 \sqsubseteq S$. For the military square lattice of FIG. 1D, we have $S0 \oplus S1 = S1$ and $S1 \oplus S2 = S3$. Previous IFC methods tend to be conservative in calculating the security class for the output of an operation since they do not consider the value that the objects can take and consider solely its security level. A higher security level will often not affect a lower one, even if it is involved in a computation. Specifically, consider n data objects A1, A2, . . . , An belonging to security classes S1, S2, . . . , S" respectively. When an operation is performed on these data objects, the security class of the output will be determined using equation (1). This is doubtlessly secure since we have $L(Ai) \sqsubseteq S$, i−1, 2, . . . , n. However, it can be conservative because information contained in the data objects may not necessarily affect the output.

$$S = S1 \oplus S2 \oplus \ldots \oplus Sn \quad (1)$$

GLIFT with the invention provides a more precise approach to IFC in that the output is bounded to the most restrictive security class whose data actually has an influence at the output. Prior GLIFT methods are only capable of targeting the two-level linear lattice of FIG. 1A. Table 1 defines the symbolic rules, namely label propagation rules, for calculating the security class of the output on an example two-input AND gate (AND-2). In the table, the symbol (S0, 0) represents a class S0 logic '0' input; (S1, 1) denotes a class S1 logic '1' input, and so forth.

TABLE 1

GLIFT label propagation rules for AND-2
on the two-level linear security lattice.

| AND | (S0, 0) | (S0, 1) | (S1, 0) | (S1, 1) |
| --- | --- | --- | --- | --- |
| (S0, 0) | (S0, 0) | (S0, 0) | (S0, 0) | (S0, 0) |
| (S0, 1) | (S0, 0) | (S0, 1) | (S1, 0) | (S1, 1) |
| (S1, 0) | (S0, 0) | (S1, 0) | (S1, 0) | (S1, 0) |
| (S1, 1) | (S0, 0) | (S1, 1) | (S1, 0) | (S1, 1) |

Consider S0 and S1 as the trusted and untrusted security classes respectively. From row 4, column 1 of table 1, whenever one of the inputs of AND-2 is trusted 0, the output will be dominated to (S0, 0). In this case, information contained in the other input will not be able to flow to the output since its output will be a constant 0 regardless. This is opposed to the conventional operator which would have conservatively computed $S0 \oplus S1 = S1$ as the output label even though (S1, 1) has no affect on the output.

Example Three-Level Liner Security Lattice

Embodiments of the invention expand GLIFT to multi-level lattices. To illustrate an example embodiment, example security classes, the ordering of the classes and bit encodings are defined. The process illustrates also how to expand to a general N-level linear lattice and a four-level square. In the example three-level linear security lattice, the security classes are SC={S0, S1, S2}. One can expand two rows and columns upon Table 1 to include label propagation rules defined for S2, which is shown in Table 2. This also indicates the compatibility and reducibility of label propagation rules among different linear security lattices.

TABLE 2

GLIFT LABEL PROPAGATION RULES FOR AND-2 ON THE THREE-LEVEL LINEAR SECURITY LATTICE.

| AND | (S0, 0) | (S0, 1) | (S1, 0) | (S1, 1) | (S2, 0) | (S2, 1) |
|---|---|---|---|---|---|---|
| (S0, 0) | (S0, 0) | (S0, 0) | (S0, 0) | (S0, 0) | (S0, 0) | (S0, 0) |
| (S0, 1) | (S0, 0) | (S0, 1) | (S1, 0) | (S1, 1) | (S2, 0) | (S2, 1) |
| (S1, 0) | (S0, 0) | (S1, 0) | (S1, 0) | (S1, 0) | (S1, 0) | (S1, 0) |
| (S1, 1) | (S0, 0) | (S1, 1) | (S1, 0) | (S1, 1) | (S2, 0) | (S2, 1) |
| (S2, 0) | (S0, 0) | (S2, 0) | (S1, 0) | (S2, 0) | (S2, 0) | (S2, 0) |
| (S2, 1) | (S0, 0) | (S2, 1) | (S1, 0) | (S2, 1) | (S2, 0) | (S2, 1) |

We use A, B and O to denote the objects representing the inputs and output of AND-2 respectively. Their security classes are denoted by $a_t$, $b_t$ and $o_t$ respectively. The GLIFT logic for AND-2 can be derived from table 2, which are shown in (2) and (3).

$$o_t[1] = Ba_t[1]\overline{a_t[0]}b_t[1] + A\overline{a_t[1]}b_t[1]\overline{b_t[0]} + a_t[1]\overline{a_t[0]}b_t[1]\overline{b_t[0]} \quad (2)$$

$$o_t[0] = B\overline{a_t[1]}a_t[0]\overline{b_t[1]} + Ba_t[1]\overline{a_t[0]}\overline{b_t[1]}b_t[0] + \quad (3)$$
$$A\overline{a_t[1]}a_t[0]b_t[1]\overline{b_t[0]} + A\overline{a_t[1]}\overline{b_t[1]}b_t[0] + \overline{a_t[1]}a_t[0]\overline{b_t[1]}b_t[0]$$

For the example three-level linear lattice, two-bit labels are used to denote three security classes. This leads to a don't-care input set because two binary bits can encode a total of four security classes. As an example, assume S0, S1 and S2 are assigned binary codes "00", "01" and "10" respectively. Then, the input pattern "11" will be don't-care condition. Such don't-care input combinations will not lead to a security policy violation since the fourth security class is undefined. However, denoting such don't-care conditions to the logic synthesizer will lead to better implementation results. Equations (4) and (5) give the GLIFT logic with consideration of the don't-care input set. These are less complex as compared to (2) and (3) respectively.

$$o_t[1] = Ba_t[1] + Ab_t[1] + a_t[1]b_t[1] \quad (4)$$

$$o_t[0] = \quad (5)$$
$$Ba_t[0]\overline{b_t[1]} + \overline{B}a_t[1]b_t[0] + A\overline{a_t[1]}b_t[0] + \overline{A}a_t[0]b_t[1] + a_t[0]b_t[0]$$

For the n-level linear lattice, there are a total of $(2n)^2$ entries in the label propagation rule table. Thus, this approach will soon become intractable as n grows. Preferred embodiments provide an alternate way to derive GLIFT logic under arbitrary level of linear lattices.

N-Level Security Lattice

Figure 2:
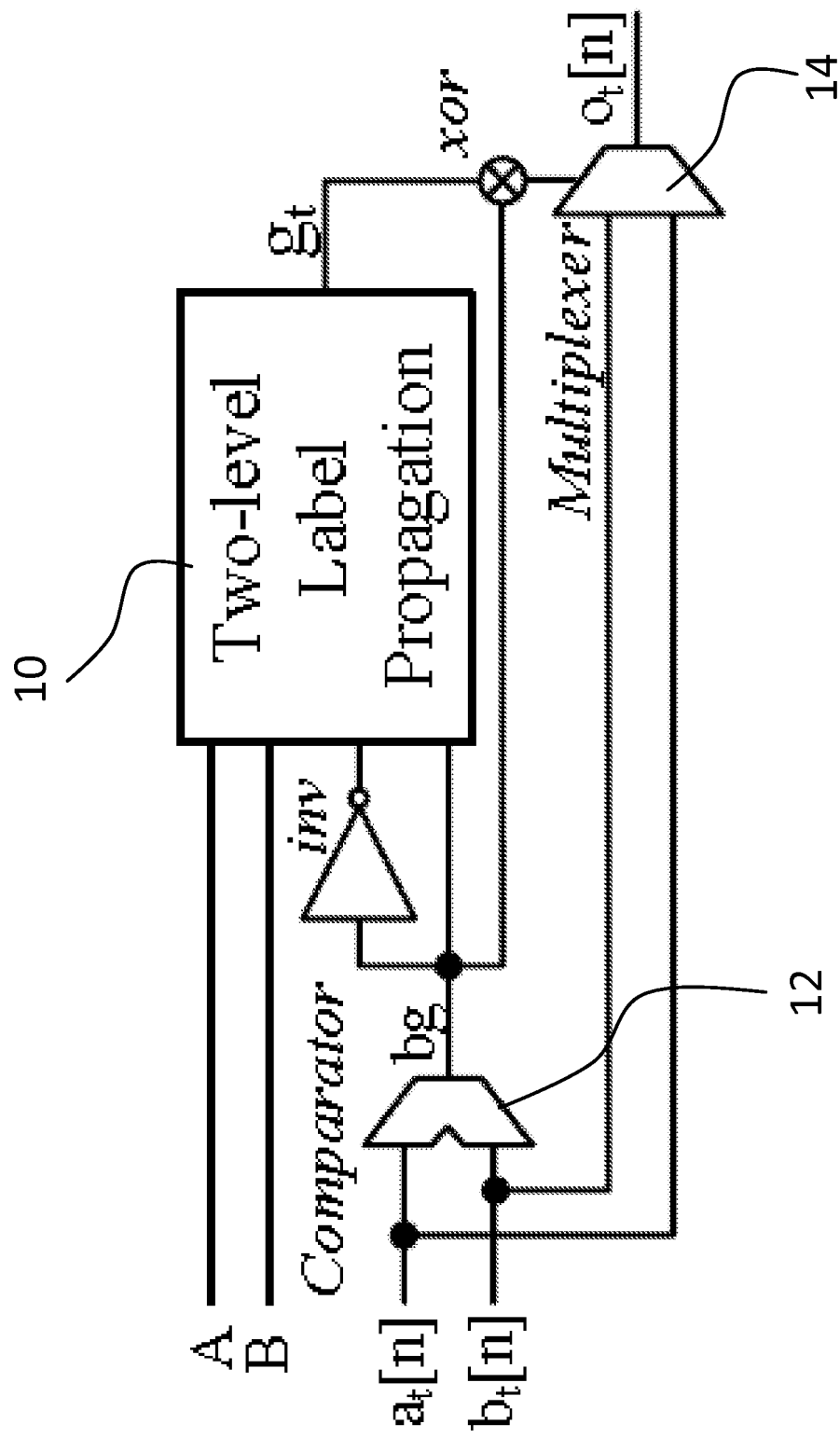
FIG. 2 illustrates a method and example hardware implementation of the invention for providing gate level information flow tracking (GLIFT) for generalized n-level lattice.

FIG. 2 illustrates a preferred method of the invention toward deriving GLIFT logic under an n-level linear lattice, which converts two-level GLIFT security labels to n-Level security level lattice. In FIGS. 2, A and B are the data inputs. The inputs A and B are provided to a two-level label propagation logic 10. The Two-Level Label Propagation logic can be the label propagation for any 2-level GLIFT logic function, including prior GLIFT discussed in the background of the application. The variables $a_t[n]$ and $b_t[n]$ are security labels of the inputs A and B. The n here represents the size of the linear lattice, in other words, $a_t[n]$ and $b_t[n]$ are from an n-level lattice. A comparator 12 compares the security levels of $a_t[n]$ and $b_t[n]$ and identifies the higher level security label. The wire bg represents which label is of higher security, having been identified by the comparator 12. The write $g_t$ is the output of the 2-level label propagation block and $o_t[n]$ is the security label of the output.

Since each two of the security classes within an n-level linear lattice are comparable, the comparator 10 can be used to convert the input labels, i.e., security classes, to two-level and use the GLIFT logic under the two-level linear lattice for label propagation in the logic 12. Preferred GLIFT logic for the two-level linear lattice for label propagation is given in J. Oberg, et al., "Theoretical Analysis of Gate Level Information Flow Tracking," Proc. Of the Design Automation Conference (DAC) pp. 244-47 (2010). At the output stage, a multiplexer 14 is used to select the correct security class according to the output from the GLIFT logic. This approach expands GLIFT to arbitrary linear security lattices.

GLIFT logic according to FIG. 2 for the AND-2 gate is given in (6) and (7). The logic is obtained under the four-level lattice by expanding the propagation rule set of Table II and applying the FIG. 2 logic. It remains constant even as n grows.

$$o_t[1] = Ba_t[1] + Ab_t[1] + a_t[1]b_t[1] \quad (6)$$

$$o_t[0] = Ba_t[1]a_t[0] + \overline{B}a_t[1]\overline{b_t[1]}b_t[0] + Ba_t[0]\overline{b_t[1]} + \quad (7)$$
$$A\overline{a_t[1]}b_t[0] + \overline{A}\overline{a_t[1]}a_t[0]b_t[1] + Ab_t[1]b_t[0] + a_t[0]b_t[0]$$

For an m-level linear lattice, it is possible to use the comparator for the n-level linear lattice. There can be an additional don't-care input set for an m-level linear lattice. By choosing a proper n satisfying $\lfloor \log_2 m \rfloor = \lfloor \log_2 n \rfloor$, $m \leq n$ or denoting the don't-care conditions to the logic synthesizer, one can obtain optimized GLIFT logic with reduced area and delay.

Military Square Lattice

FIG. 1D show an example military square lattice. A principle difference between the military square lattice and linear ones such as shown in FIGS. 1B and 1C is that the square lattice contains incomparable security classes, i.e., S1 and S2. This results in more subtle cases in label propagation. As an example, consider AND-2 with inputs (S1, 0) and (S2, 0). The output is doubtless logic '0'. In this case, both inputs have an influence at the output. Which label to choose at the output is not obvious since neither S1 or S2 is more restrictive than the other. Fortunately, S1, S2 and even S3 are all safe security classes for the output since they will not lead to an information security policy violation. However, S1 and S2 are more restrictive than S3. Thus, either S1 or S2 can be selected as the security class for the output.

To make it different from the four-level linear lattice, we choose S1 for the AND-2 gate while S2 for the two-input OR gate (OR-2) when both S1 and $S^2$ are safe. Under such convention, the GLIFT logic for AND-2 under the military square lattice can be formalized as follows:

$$o_t[1] = Ba_t[1]\overline{b_t[0]} + Ba_t[1]a_t[0] + A\overline{B}b_t[1] + \quad (8)$$
$$\overline{A}Ba_t[1] + A\overline{a_t[0]}b_t[1] + Ab_t[1]b_t[0] + a_t[1]b_t[1]$$

$$o_t[0] = \quad (9)$$
$$\overline{B}a_t[1]\overline{b_t[1]}b_t[0] + Ba_t[0] + \overline{A}\overline{a_t[1]}a_t[0]b_t[1] + Ab_t[0] + a_t[0]b_t[0]$$

The problem with tracking information flows on a non-linear security lattices lies in that the security class of the output can be chosen too conservatively (although safe). A possible solution is to construct a candidate set of security classes that will not lead to an information flow policy violation and then choose the most restrictive one(s) from the candidate as the output label.

Complex Multi-Level GLIFT Libraries

Figure 3:
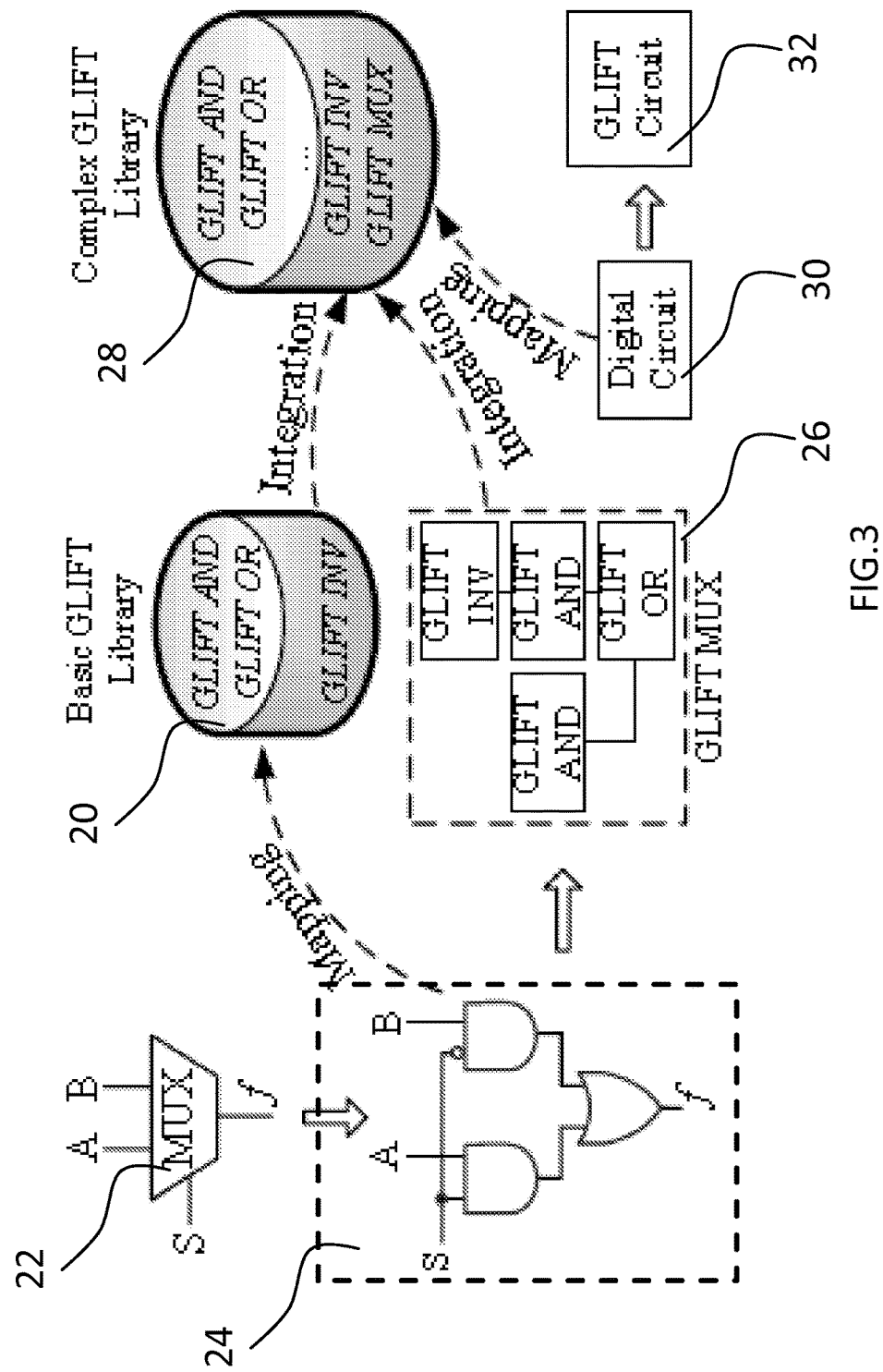
FIG. 3 illustrates a constructive method of the invention for providing generalized multi-level GLIFT while reducing the general GLIFT logic generation problem to solving just two-input gates.
Figure 4:
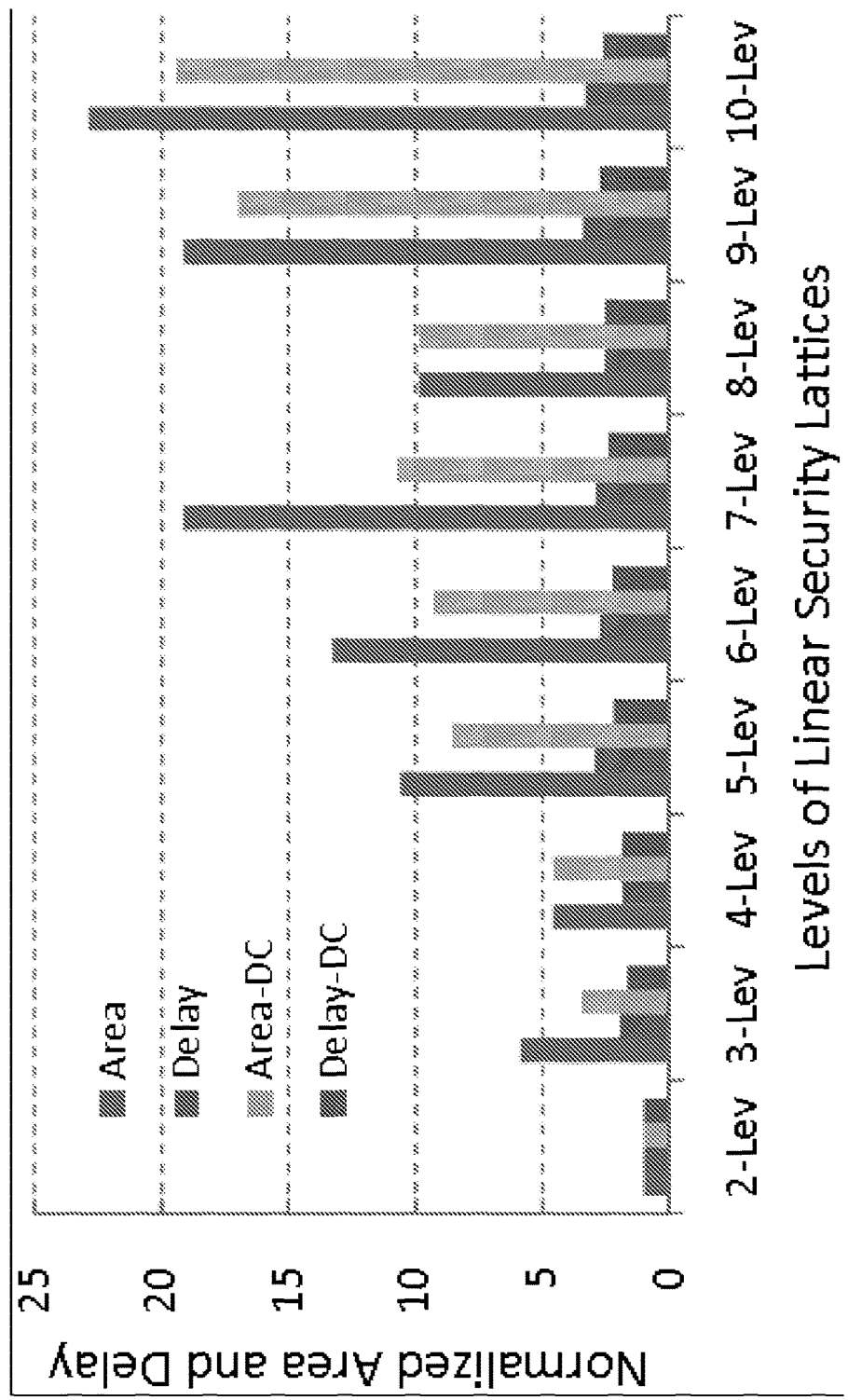
FIG. 4 illustrates experimental simulation results comparing area and delay of tracking logic for AND-2 under n-level linear lattices normalized to those under two-level linear lattice.

More complex GLIFT libraries and circuits consisting of multiple-input gates can be created in a constructive manner. FIG. 3 shows such a constructive method, which reduces the general GLIFT logic generation problem to solving just two-input gates. With the logic of FIG. 3, GLIFT logic can be generated in linear time, and the tracking logic for components in digital circuits discretely from a functionally complete GLIFT library.

In FIG. 3, the basic design flow for inserting GLIFT logic into a design is shown. First, the GLIFT logic for every gate in a hardware design is created and stored in a basic GLIFT library 20 to be used later when analyzing a circuit. An example analysis of a multiplexor 22 is shown. Inputs A, B, and S are inputs to multiplexer (MUX) with output f Gate-level logic gates 24 are mapped for the multiplexor 22 from the basic GLIFT library 20. In this example, this MUX 22 then has all of its gates replaced by its appropriate GLIFT logic 26 that was previously created and stored in the basic library 20 and selected based upon the mapping. A GLIFT multiplexor functional component 26 is constructed from individual gate GLIFT logic modules from the library, which in this case are GLIFT AND, GLIFT OR, and GLIFT INV. GLIFT AND is the GLIFT logic for an AND gate, GLIFT OR that of an OR, and GLIFT INV that of an inverter. This GLIFT logic 26 for a MUX functional component can now be added into a complex library module 28 as shown in the Complex GLIFT Library. From this library, a Digital Circuit 30 can then have its logic, functional component by component, replaced with multi-level security logic to create a multi-level GLIFT circuit 32.

Label-Propagation Generalized

The invention provides a strategy for propagating labels precisely through a boolean function by using the input values and the Boolean function itself to determine a Candidate Set of labels that are all information flow secure assignments, and then choose the least conservative label from this set.

As an example, to be information flow secure when an output is labeled S1, the method checks whether the only inputs that can affect the output should have labels that are dominated by S1 in the lattice. In case there is more than one non-comparable label in the Candidate Set, the method shows that it is information flow secure to choose any one of them to be propagated.

Understanding the determination of candidate labels is aided by a definition of the Conflict Set of a label. The conflict set for a label includes labels that are either more conservative or labels that are mutually unordered with the label under consideration. For the purposes of non-interference, once an output is assigned a label, no input with a label belonging to the assigned label's conflict set should be able to affect the value of the output.

Algorithms 1 and 2 provide a preferred embodiment label propagation method for a general lattice. The method takes as inputs the logic function and the lattice of labels, and generates a shadow logic function that tracks information flow through the given logic function. This requires enumerating the entire truth table for the shadow logic function, and for each row of the shadow truth table, assigning a precise yet safe security label from the lattice to the output.

In the first step, the algorithm generates inputs for the truth table of the shadow logic function by iterating over every possible assignment to the function's inputs and their labels. The second step executes for each row in the shadow truth table. The algorithm begins by considering every label in the lattice as a potential candidate label for the output. For this, the algorithm computes the current label's conflict set and uses these to find inputs that have labels belonging to this conflict set. A check is conducted to determine whether any combination of inputs that have conflicting labels can affect the value of the output. If the output is affected by some combination of such inputs, then the current label under consideration is not a valid candidate output label. The algorithm then moves on to examine the next label, until, in the worst case, the most conservative label is added to the candidate set.

Algorithm 1 shows the main algorithm for propagating labels through "F" when the labels belong to a general lattice. For each row of the shadow truth table, the algorithm works by determining the lowest possible label such that no combination of inputs with a label above or incomparable with the chosen label can affect F's output.

```
procedure propagateLabel
input F : combinatorial logic function
input Labels : set of all labels
input Lat : lattice representation of all labels
input X : set of inputs to F with values in 0,1
input L : set of input labels with values in Labels
output Sh_F : truth table for shadow F
X Set ← Set of all possible assignments to X
LSet ← Set of all possible assignments to L
{Shadow truth table requires all combinations of
# X ∪ L}
for each XRow ∈ X Set do
    for each LRow ∈ LSet do
        Candidate_set ← φ
        {All labels are candidates for output label of
        the row}
        for each label ∈ Labels do
            {C : Set of conflicting inputs for label}
            C ← φ
            for each l_i ∈ LRow do
                if Lat.conflictsWith(l_i,label) then
                    {x_i is the input corresponding to label l_i}
                    C ← C ∪ {x_i}
                end if
            end for
            {Check if C affects F(X_row)}
            if not isAffectedBy(F, X_row, C) then
                Candidate_set ← Candidate_set ∪ {label}
            end if
        end for
        Sh_F_row ← Lat.ChooseMin(Candidate_set)
        Print X_row,T_row, Sh_F_row
    end for
end for
end procedure
```

Algorithm 2 is used in Algorithm 1 to check if the value of a combinatorial function F is affected by a given subset of its inputs.

```
procedure isAffectedBy
input F : combinatorial logic function
input X_row : set of input values
input C_row : a subset of inputs
func_row ← F(X_row)
{Toggle each combination of subset's elements, and}
{Check if F's output changes}
```

-continued

```
for each Comb ∈ power set of C_row do
    Comb_inv ← {c_i}, where c_i ∈ Comb
    func_inv ← F(Comb_inv ∪ (X_row - Comb))
    if func_inv ≠ func_row then
        return 1
    end if
end for
return 0
end procedure
```

The most conservative label is always a candidate label, as information can flow from all labels to it (i.e., its conflict set is null). This ensures that the algorithm is guaranteed to assign at least one label for the output for every row in the shadow truth table. Having considered all labels, the algorithm will output a candidate set of labels that are all safe to be assigned to the output. The order in which labels are considered is not important.

In the final step, once a candidate set of labels is found, the algorithm will assign the output label most precisely by choosing a label from the candidate set that is the least conservative (or is lowest in the lattice). This choice depends on the following two conditions:

Handling Totally Ordered Labels: If one label in the candidate set is totally ordered and lesser than all the other candidates (i.e. there is a unique lowest candidate label), assign it as the output label.

Handling Mutually Unordered Labels: If there are multiple, mutually unordered labels in the candidate set (e.g. S1 and S2) that are lower than all other labels in the candidate set, then it is safe to choose either one as the output label. We will analyze this case in more detail.

For most cases, there is one label that is the lowest among the candidate labels. Multiple incomparable choices emerge when multiple non-comparable labeled inputs have no effect on the output. This occurs, for example, when both inputs a and b are 0 and have labels Secret1 and Secret2 from a square lattice (as shown in FIG. 1D). For this set by itself affects the value of the output, and hence both Secret1 and Secret2 could be assigned to the output label legally and belong to the Candidate Set.

Conventionally, given two inputs with labels Secret1 and Secret2, the output would be marked as Top Secret. The method of the invention instead selects any one of the lowest candidate labels as the output label, even though they are mutually unordered, while ensuring security and also maintaining precision. Security is maintained because the algorithm checkes that the input's conflict set is ineffective, while not using Top Secret allows the output to remain at a lower security level.

An additional example can demonstrate why choosing any one label is secure. Add a new label Secret3 to the square lattice such that Secret1 dominates Secret3 while Secret2 is incomparable with Secret3. The logic function to be shadowed has two steps: in the first step, Secret1 and Secret2 inputs produce an intermediate output, which is later AND-ed with Secret3-labeled input to create the final output. The interesting case occurs when all three inputs individually do not affect the output, for example when the functions at each step are 2-input AND gates, and all three inputs are 0s. When S1 is chosen after the first step, $0_{Secret1} \& 0_{Secret2} = 0_{Secret1} \cdot 0_{Secret1} \& 0_{Secret3} = 0_{Secret3}$. When Secret2 is chosen, $0_{Secret1} \& 0_{Secret2} = 0_{Secret2} \cdot 0_{Secret2} \& 0_{Secret3} = 0_{Secret3}$ or $0_{Secret2}$. This provides the output label being either a precise Secret3 or an imprecise (but safe) Secret2. In either case, the output was not labeled overly conservatively as Top Secret.

The example algorithm is not optimized for efficient execution time. Rather, it is deliberately independent of performance optimizations such as traversing the lattice from bottom to top. This was done for the purposes of illustration to emphasize how the security property is enforced. Artisans will recognize.

Experimental Simulations

To show how the complexity of tracking logic for primitive gates scales, we generated GLIFT logic for the AND-2 gate under several linear security lattices with and without considering the Don't-care set. The resulting circuits are then synthesized using the ABC tool and mapped to the mcnc standard cell library. FIG. 3 shows the experimental results normalized to the area and delay of GLIFT logic under two-level linear lattice.

The experiments generated GLIFT logic for several IWLS benchmarks under the two to four level linear and square security lattices. Tracking logic is augmented discretely in a constructive manner from a functionally complete GLIFT library. The resulting circuits are synthesized using Synopsis Design Compiler and targeted to its 90 nm standard cell library for area, delay and power reports, as shown in Table III.

TABLE III

| Benchmark | Area (um²) | | | | Delay (ns) | | | Power (mW) | | |
| --- | --- | --- | --- | --- | --- | --- | --- | --- | --- | --- |
| | 2-lev | 3-lev | 4-lev | Square | 2-lev | 3-lev | 4-lev | 3-lev | 4-lev | Square |
| alu2 | 9833 | 25787 | 30410 | 35571 | 2.10 | 2.71 | 2.66 | 4.99 | 6.45 | 6.95 |
| alu4 | 21242 | 54860 | 64457 | 75869 | 2.85 | 3.41 | 3.54 | 10.9 | 13.8 | 15.1 |
| pair | 44261 | 113885 | 133797 | 159606 | 1.63 | 2.03 | 1.99 | 19.9 | 26.9 | 28.8 |
| i10 | 60371 | 153896 | 183421 | 216059 | 3.48 | 4.61 | 4.24 | 28.3 | 34.6 | 37.7 |
| C1355 | 16854 | 42910 | 50449 | 59677 | 1.46 | 1.75 | 1.80 | 7.42 | 10.4 | 10.1 |
| C1908 | 13682 | 33978 | 40279 | 47558 | 2.26 | 2.66 | 2.73 | 4.75 | 9.22 | 9.55 |
| C2670 | 19670 | 50100 | 59216 | 69478 | 1.90 | 2.41 | 3.42 | 8.57 | 12.8 | 13.1 |
| C3540 | 32255 | 83947 | 98314 | 115755 | 2.66 | 3.20 | 3.10 | 14.3 | 19.8 | 21.0 |
| C5315 | 47318 | 122897 | 144400 | 171901 | 2.32 | 2.96 | 2.84 | 19.4 | 31.4 | 32.7 |
| C6288 | 83678 | 215020 | 250832 | 293322 | 8.73 | 9.84 | 10.2 | 23.8 | 53.8 | 52.8 |
| C7552 | 53603 | 135958 | 162224 | 190607 | 3.31 | 3.71 | 3.74 | 19.6 | 36.8 | 37.5 |
| DES | 102563 | 269418 | 314533 | 379610 | 1.30 | 1.64 | 1.62 | 48.1 | 71.6 | 83.8 |
| N. Average | 1.00 | 2.57 | 3.03 | 3.58 | 1.00 | 1.22 | 1.26 | 2.55 | 3.80 | 4.00 |

From Table III, GLIFT logic typically reports larger area and delay and consumes more power as the security lattices grow more complex. Row N. Average shows the average area, delay and power normalized to those under the two-level linear lattice, reflecting design overheads. It should be noticed that GLIFT logic under the three-level linear lattice is relatively less complex than that for the four-level linear lattice. This is because the don't-care input set was taken into consideration and denoted these don't-cares to the logic synthesis tools.

From the experimental results, expanding GLIFT to multilevel security lattices will result in considerable area and performance overheads. However, most systems require MLS policies modeled using more complex security lattices. The prior GLIFT technique is expanded via the invention to meet this need. Security is a pressing problem in safety-critical embedded systems. Such overheads should definitely be tolerated since a single failure resulting from security issues will render critical embedded systems useless and cause tremendous losses. In real applications, there are usually partitions among security domains within a design. Only security critical portions of the design need to be augmented with GLIFT logic for dynamic IFT. In addition, GLIFT can also be used for static information flow security verification. The additional GLIFT logic can be removed when verification is complete. This will reduce the area and performance overheads and enable GLIFT to be employed for proving multi-level security.

The invention can thus provide an effective approach for enforcing tight information flow controls to prevent harmful flows of information, including those through hardware-specific timing channels. The invention expands GLIFT to more general security lattices and formalizes tracking logic for the multi-level security. The complexity analysis shows that critical embedded systems can benefit from the gates up. Area and performance overheads are weighed against the criticality of protecting systems requiring multi-level security.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for providing multi-level security to a gate level information flow, the method comprising:
   receiving or specifying a security lattice having more than two security levels, wherein the security lattice defines how security levels relate to each other by defining permitted communication channels between security levels and permitted information flow directions between the security levels;
   receiving a hardware design implementing information flows including flows having security levels specified by the security lattice;
   creating logic for testing the hardware design in view of the security lattice, wherein at least a portion of the hardware design is synthesized into primitive gate level hardware components and the logic adds more than two security level tracking logic to the gate level hardware components to test for violations of the permitted communication channels and the permitted information flow directions; and
   outputting a logic function based upon the hardware design and the logic for testing to implement the security lattice.

2. The method of claim 1, further comprising converting the logic function to a hardware design specification.

3. The method of claim 1, wherein the hardware design is in a hardware description language.

4. The method of claim 1, wherein said creating comprises building functional components of the hardware design from gate-level GLIFT (gate level information flow tracking) components to create complex GLIFT functional components and said outputting replaces portions of the hardware design with the complex GLIFT functional components.

5. The method of claim 1, wherein said receiving or specifying a security lattice comprises converting a two-level GLIFT label propagation logic to a more than two level security label propagation logic.

6. The method of claim 1, wherein
   said receiving receives the hardware design in a hardware description language;
   said creating logic comprises building functional component tracking logic;
   and further comprising simulating functional components in the hardware design with the functional component tracking logic.

7. The method of claim 6, further comprising testing an information flow labeled with one of the security levels for leaking to a lower classified security level area of the hardware design.

8. The method of claim 7, wherein said testing accounts for values that can be taken by the information flow in addition to the security level of the information flow.

9. The method of claim 7, wherein said simulating comprises gate level information flow tracking and an output of the flow tracking is bounded to the most restrictive security class whose data has an effect on the output.

* * * * *